United States Patent [19]

Crepeau et al.

[11] 4,240,839

[45] Dec. 23, 1980

[54] THERMAL INSULATION MATERIAL

[75] Inventors: Charles E. Crepeau, Centre Square; Robert F. Mulvey, Malvern, both of Pa.

[73] Assignee: General Electric Company, Philadelphia, Pa.

[21] Appl. No.: 52,702

[22] Filed: Jun. 28, 1979

[51] Int. Cl.³ .............................................. C04B 11/00
[52] U.S. Cl. ........................................ 106/88; 106/111
[58] Field of Search .......................... 106/88, 110, 111

[56] References Cited

U.S. PATENT DOCUMENTS

| 1,798,609 | 3/1931 | Knowlton | 156/42 |
|---|---|---|---|
| 2,731,377 | 1/1956 | Riddell et al. | 106/88 |
| 2,862,829 | 12/1958 | Dixon et al. | 106/88 |
| 3,563,777 | 2/1971 | Pratt et al. | 106/88 |
| 3,758,319 | 9/1973 | Ergene | 106/88 |
| 3,775,351 | 11/1973 | Sachs | 106/88 |
| 3,926,650 | 12/1975 | Lange et al. | 106/88 |
| 3,974,024 | 8/1976 | Yano et al. | 106/88 |

*Primary Examiner*—James Poer
*Attorney, Agent, or Firm*—Stephen A. Young

[57] ABSTRACT

An improved material particularly suited for the thermal insulation of building structures such as residential housing. The material comprises an inorganic, low-density cellular thermally insulating foam comprising a gypsum matrix having minute cavities homogeneously distributed therein. The material has a dry density of less than about 3 pounds per cubic foot and a thermal coefficient of less than about 0.37.

10 Claims, 5 Drawing Figures

THERMAL PERFORMANCE
VS.
DENSITY

THERMAL INSULATION MATERIAL

CROSS REFERENCE TO RELATED APPLICATIONS

U.S. Application Ser. No. 874,452, filed Feb. 2, 1978, now U.S. Pat. No. 4,161,855 issued July 24, 1979, entitled "Thermal Insulation Material And Process For Making The Same," inventors—Mulvey and Crepeau, and U.S. Application Ser. No. 35,869, filed May 3, 1979, entitled "Thermal Insulation Material," inventors—Mulvey and Crepeau, both applications assigned to the same assignee as the assignee of the present invention.

BACKGROUND OF THE INVENTION

1. Field of the Invention

This invention relates to thermally insulating materials, and more particularly to inorganic cellular materials.

2. Description of the Prior Art

A wide variety of both inorganic and organic materials have been employed for thermal insulation of building structures.

For example, inorganic materials such as fiberglass and so called rock-wool find widespread application in the United States for residential housing.

More recently, organic materials such as polyurethane foam, and styrofoam have been used primarily for other than residential housing applications.

While the prior art materials exhibit varying degrees of effectiveness as thermal insulators, none of the prior art materials has been completely satisfactory from an overall standpoint.

For example, while the organic foams, in general have better thermal insulative properties than fiberglass, the fire retardant and smoke emission characteristics of the organic foams are less than optimum. Indeed, even fiberglass insulation is found to emit large quantities of smoke when exposed to the flame of a propane torch.

Also, the prior art materials are relatively expensive and require raw materials and processing not readily available in many areas of the world. Since the world in general has a shortage of residential housing, this is a decided disadvantage.

OBJECTS OF THE INVENTION

Accordingly, it is an object of this invention to provide an improved thermal insulation material and a process for making the same.

It is a further object of this invention to provide an improved thermal insulation material suitable for the insulation of building structures such as residential housing.

It is yet another object of this invention to provide a thermal insulation having improved thermal and fire retardant characteristics.

It is still another object of this invention to provide an improved thermal insulation which is less expensive than conventional insulations.

A still further object of this invention is to provide an improved thermal insulation material formed from raw materials which are readily available in most areas of the world and which is particularly suited for industrialized construction.

SUMMARY OF THE INVENTION

Briefly, the improved thermal insulation of the invention comprises a low density inorganic foam gypsum material. The foam insulation of the invention is produced by intimately mixing a water based gypsum slurry with a water based froth of a foaming agent such as sodium lauryl ether sulfate. The froth provides small stable bubbles of air which upon mixing with the slurry become encapsulated by the slurry mixture. The slurry material then hardens about the bubbles to produce the low density foam insulation of the invention. A variety of additives such as accelerators and retarders can be included in the slurry mixture. in this manner, a low density inorganic foam can quickly cure to a dry density of less than about 3 pounds per cubic foot and have a thermal coefficient of less than about 0.37.

DESCRIPTION OF THE PREFERRED EMBODIMENT

Figure 1:
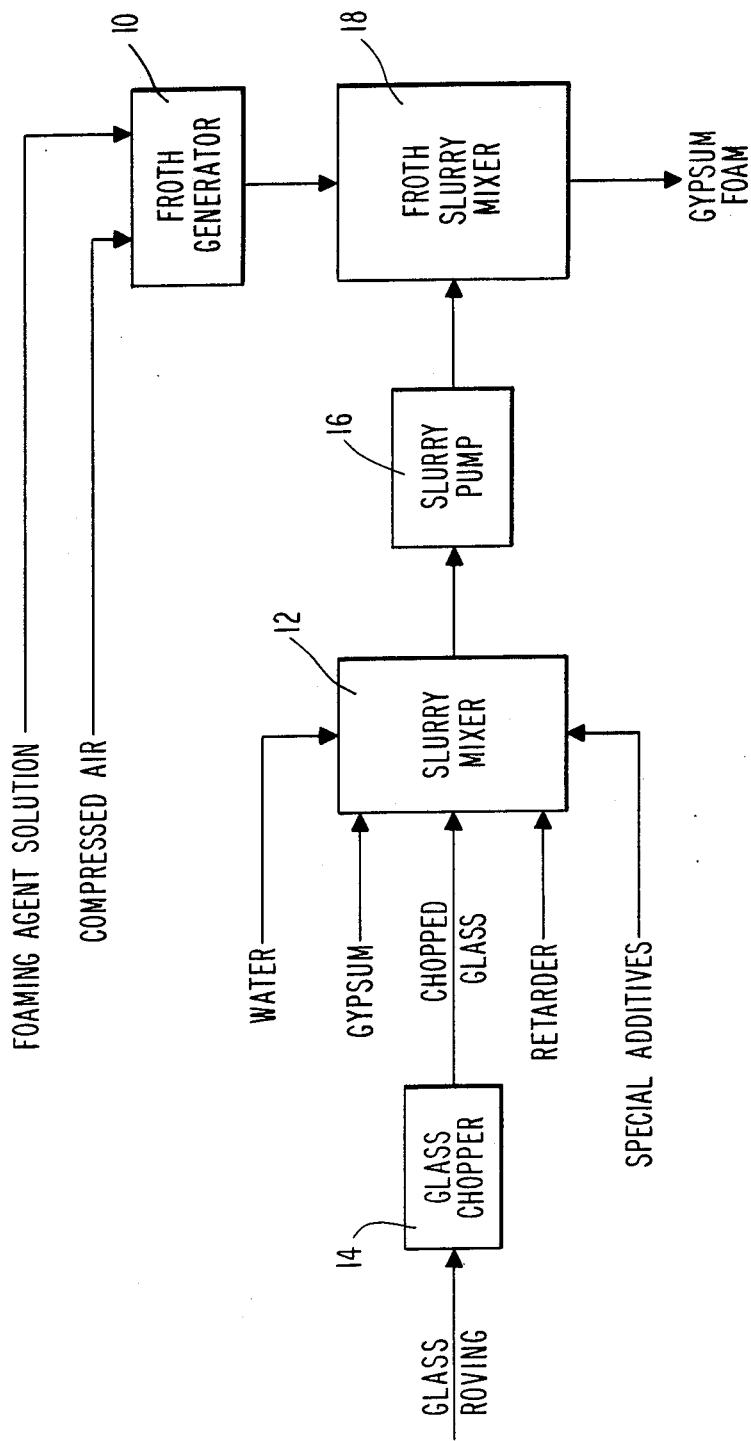
FIG. 1 is a flow diagram of the process for making thermal insulation material in accordance with the invention.

Referring now to FIG. 1, there is shown a simplified flow diagram of the process for producing the low density foam insulation of the invention. The process features two principal streams, a first stream generating a highly stable froth which is combined with a gypsum slurry generated by the second stream to produce the foam insulation of the invention.

A foaming agent, preferably a soap, sodium lauryl ether sulfate or its equivalent is dissolved in water, and is applied to a froth generator 10. Compressed air is also applied to the froth generator and the first stream of the highly stable froth is produced at the output of the froth generator. Small amounts of stabilizers, such as proteins, polyamides or polyols may be added to the foaming agent in order to stabilize the resultant froth. The amount of foaming agent in the water is typically about 4 to about 8% by weight foaming agent. Depending on the proportion of materials selected, the froth appearing at the output of generator 10 typically has a density between about 0.25 to about 0.6 pounds per cubic foot.

In the second process stream, water and gypsum are combined in a slurry mixer 12 to produce a gypsum slurry. Chopped glass is also added to the slurry to strengthen the resultant foam insulation, the chopped glass fibers being obtained by the chopping action of a glass chopper 14 on conventional fiberglass roving. A variety of known retarders and special additives such as accelerators can be added to the slurry mixture.

The output of mixer 12 which is typically 50% by weight of gypsum is pumped by a slurry pump 16 to a froth/slurry mixer 18 where it is intimately mixed with the output of froth generator 10. The froth from froth generator 10 provides small stable bubbles of air which upon mixing with the slurry in mixer 18 become encapsulated by the slurry mixture. The froth/slurry mixture typically having a wet density of about 1.6 to about 6 pounds per cubic foot is then removed from the mixer, cast into a mold and allowed to cure to produce the foam insulation of the invention typically having a dry density of about 0.8 to less than about 3 pounds per cubic foot. By varying the concentration of the gypsum slurry and froth and by adding varying lengths and concentrations of chopped glass, it is possible to extend the lower range of dry density of the foam insulation below 0.8 pounds per cubic foot.

Readily available commercial equipment may be utilized to perform the process steps depicted in FIG. 1. For example, in practice, froth generator 10 may be an integrated generator of the type widely utilized at airports for foam generation for fire extinguishing purposes. Generally, such a foam generator features a pair of air motor operated pumps the output of which can be independently varied to control the ratio of foaming agent to water. The pumps feed the foaming agent and water to a mixing chamber where the froth is produced.

Glass chopper 14 may be conventional equipment of the type employed to separate fiberglass roving into individual fibers of a desired length. Slurry pump 16 may be of the air operated diaphragm type widely used in commercial processes.

Froth/slurry mixer 18 may be a passive mixer having fixed baffles positioned therein in known fashion, the mixing action resulting from turbulence due to the high shear imparted by the baffles on the slurry and froth streams. Alternatively, the froth and slurry streams might first be applied to a premixer, the partially mixed output of which is then applied to a baffle type mixer of the type just discussed. Such pre-mixer may be of the commercially available expander/mixer type which generally comprises an increased diameter cylindrical mixing chamber at one end of which the streams to be mixed are introduced and at the other end of which the mixed material exits in a single stream. The mixing chamber can be configured to constitute what is known as a tortured path. In some applications, the expander/mixer may be packed with so-called ceramic "saddles" to enhance the mixing action in known fashion.

Further variations of the process shown in FIG. 1 will occur to those skilled in the art. For example, it may be desirable in some applications to employ a separate expander/mixer of the type just discussed to further mix the froth prior to its mixing with the slurry. Further, since slurry mixer 12 is most conveniently a batch mixer, it may be necessary to store the slurry mixture in a suitable tank prior to introduction into the froth/slurry mixer 18. Alternatively, more than one slurry mixer 12 may be employed, such mixers alternately supplying slurry to froth/slurry mixer 18.

The mold into which the wet foam from froth/slurry mixer 18 is cast may take a variety of forms. In its most simple form this may involve no more than pouring the wet foam onto a casting table having suitable restraining dams to provide foam sheets of desired size and thickness. It may be desirable in any such molding operation to screed the wet foam to insure filling of the mold while removing excess material in known fashion. It may also be desirable in some instances to vibrate the mold in known fashion to insure proper filling of the mold.

In other preferred embodiments of our invention, the molds are provided by structural elements which become an integral part of composite ceiling and wall assemblies as depicted most clearly in FIGS. 3 and 4 respectively, and discussed in connection therewith. These molds might be an already existing ceiling or hollow wall in a previously erected structure to be insulated. In a ceiling structure the wet foam may be spread over prior existing insulation, and in a wall structure the wet foam may be injected through a suitable aperture much in the manner in which rock wool is now installed.

The raw materials utilized to practice our invention are readily available in most areas of the world. The strength of the foam of the invention is provided by the gypsum which hardens on the skin of the froth bubbles to form a low density cellular structure. Such gypsum is found as a natural rock deposit in most parts of the world. In the natural state gypsum purity ranges from about 80 to 99 percent. Natural gypsum is basically calcium sulphate with two waters of hydration ($CASO_4.2H_2O$). The heating of this gypsum to roughly 400° F. (i.e. so called calcimining) will remove all but $\frac{1}{2}$ of the two waters of hydration providing a product designated as hemihydrate gypsum ($CASO_4.\frac{1}{2}H_2O$) which is the form that is normally used for making all plaster products. This form is also available as a synthetic byproduct of the fertilizer industry. Inpurities in the hemihydrate gypsum are found to have a major effect on the material performance. If the hemidydrate gypsum is incompletely calcimined and some of the original dihydrate is present, the product will cure at a greatly accelerated rate. Impurities from the fertilizer industry in the synthetic gypsum are normally phosphoric acid in the 3% range. This impurity works its way between the gypsum crystals and is extremely difficult to remove by washing, Neutralization with sodium carbonate or similar materials is very effective in removing and neutralizing the impurities. If removed and neutralized the material is quite suitable for use. Some of the fertilizer production processes, with those of Japan being the most highly developed, have been designed to produce a useful high purity gypsum and the neutralization step discussed above is not necessary.

The various gypsums available have a variety of different cure rates and therefore the accelerator/retarder system must be tailored to the material being used. Through the use of a known accelerator such as alum or known retarders such as sodium citrate or in some instances a combination thereof nearly any dihydrate gypsum material can be used to produce the foam of the invention.

Since plaster (i.e. gypsum) is well known to be slightly soluble in water and is also weakened by water (wet plaster has $\frac{1}{3}$ the strength of dry plaster) additives can in practice be utilized to minimize such weakening in the event that the foam insulation of the invention were to become wet.

Chopped fiberglass can be incorporated into the formulation to provide increased resistance to vibration and can be from about 1/16" to about 2" in length for respective concentrations ranging from about 7% to about 0.25% by weight. The shorter the length of the chopped glass the greater the concentrations that would be used. it should be understood that other fibrous materials can be used in place thereof.

Figure 2:
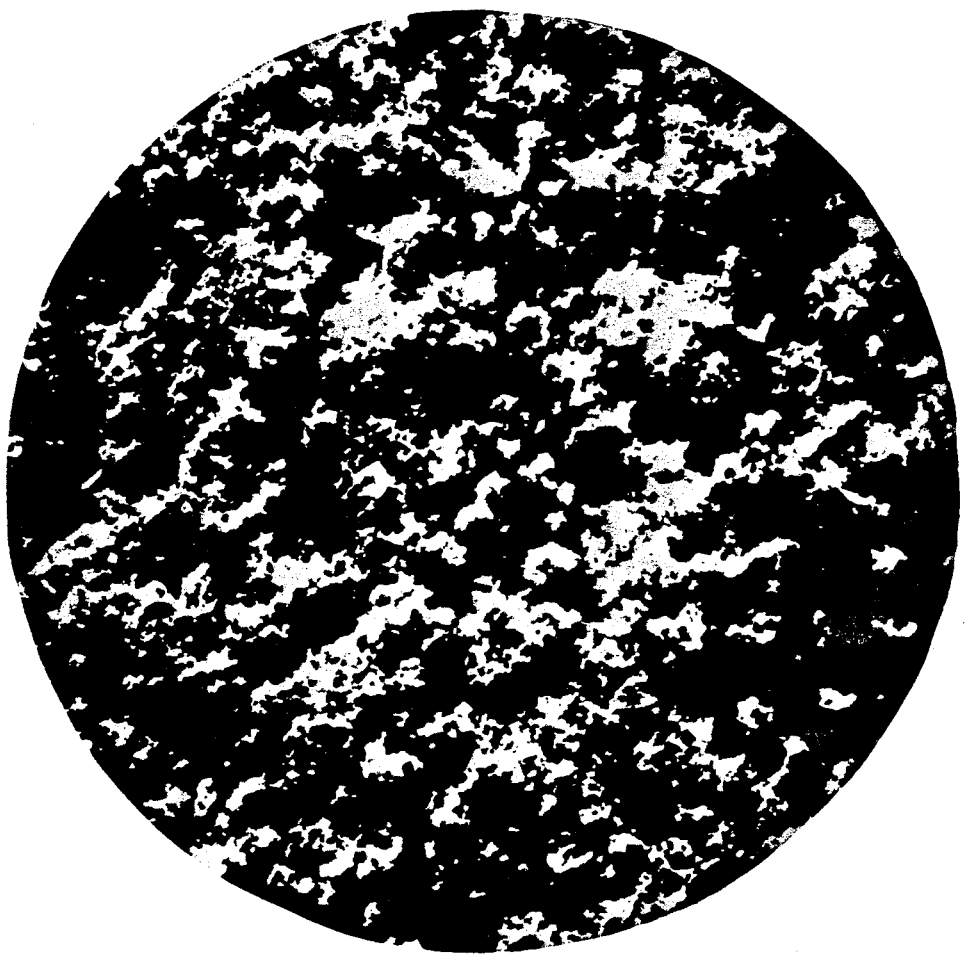
FIG. 2 is a photograph enlarged approximately 12 times of the low-density foam insulation of the invention.

Referring now to FIG. 2 there is shown a photograph of a section of the low density foam of the invention enlarged approximately 12 times. The cellular structure of the low density foam insulation of the invention, having minute cavities homogeneously distributed therein as shown in FIG. 2, is the result of the gypsum hardening on the skin of the froth bubbles as previously described. Also in FIG. 2 the chopped fiberglass fibers, which are added to the wet mixture to strengthen the resultant foam insulation, are seen to be uniformly distributed throughout the sample.

Figure 3:
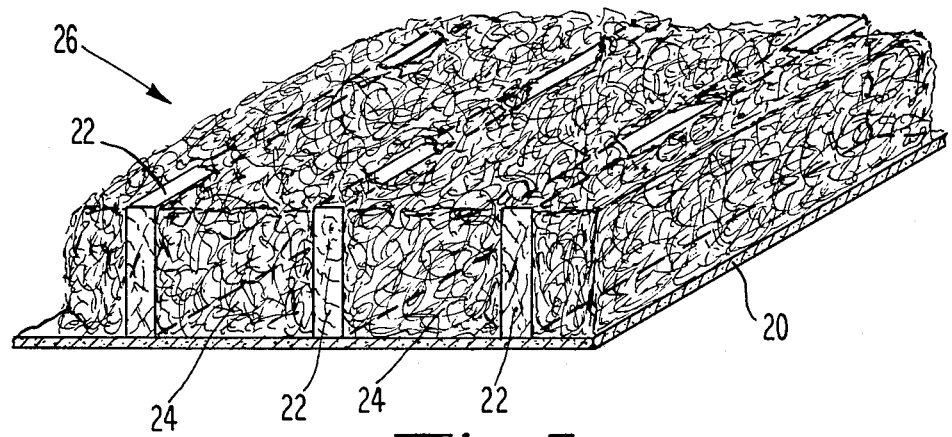
FIG. 3 is a three dimensional cutaway view showing a typical structural ceiling section employing the thermal insulation of the invention.

Referring now to FIG. 3, there is shown a preferred embodiment of the foam insulation of the invention as discussed above. As depicted in FIG. 3, a ceiling structural element 20 and horizontally and parallel positioned joists 22 can provide the mold into which foam insulation 24 is cast, the structural elements then becoming integral parts of a resulting composite ceiling assembly 26. Ceiling element 20 could be comprised of standard gypsum wall board or any other equivalent material, while the joists can be comprised of standard wood beams or other equivalent members.

Figure 4:
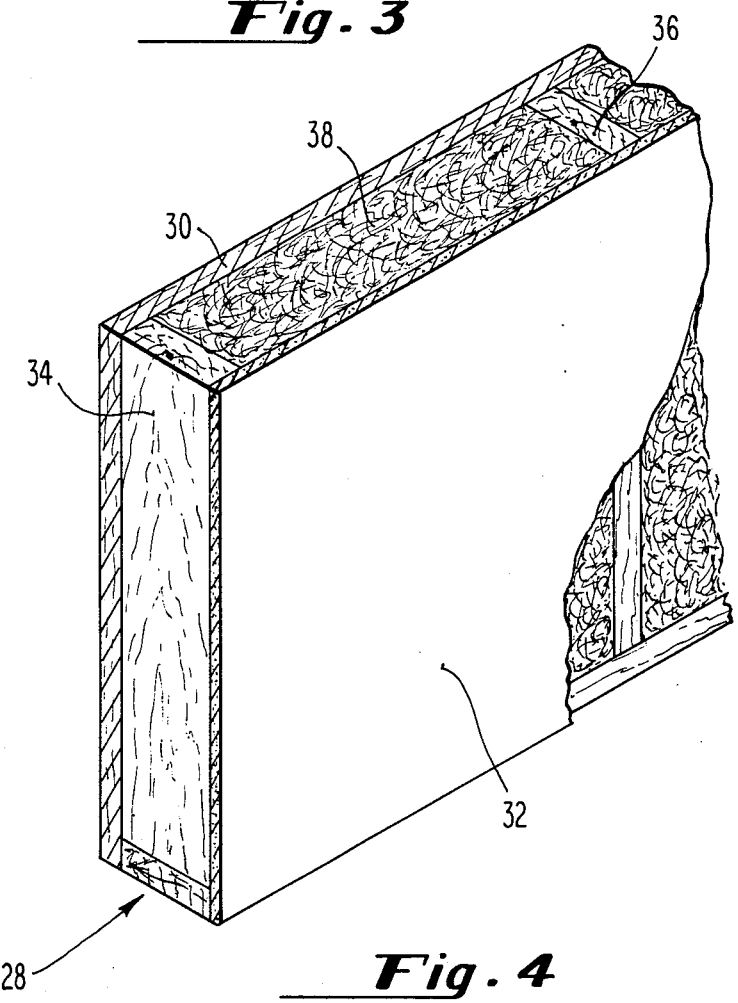
FIG. 4 is a three dimensional cutaway view showing a typical structural wall section employing the thermal insulation of the invention.

Referring now to FIG. 4, there is shown another preferred embodiment of the foam insulation of the invention as discussed above. As depicted in FIG. 4, a wall assembly 28 is shown comprised of respective wall elements 30 and 32, at least two studs 34 and 36 positioned therebetween to define a wall cavity and foam insulation 38 of the invention completely filling the wall cavity. When assembly 28 is to serve as an interior wall, wall elements 30 and 32 can be comprised of standard gypsum wall board or its equivalent. When the assembly serves as an exterior wall, wall element 30 can be formed from a vareity of cementitious materials, or a sheet material such as plywood may be employed. The foam insulation can be introduced into the wall cavity from the top of the assembly between the studs, or from a temporary hole made near the top of wall 32. Alternatively the foam insulation can be introduced between the studs and wall 30 prior to the installation of wall 32.

As previously pointed out, the low density inorganic foam of the invention finds particular application as thermal insulation in building structures, such as residential housing. Improved thermal, fire retardant and smoke emission characteristics are realized from the foam insulation of the invention at a reduced cost compared to conventional materials. The foam insulation of the invention is particularly suited for industrialized construction, and is formed from raw materials readily available in most areas of the world.

Figure 5:
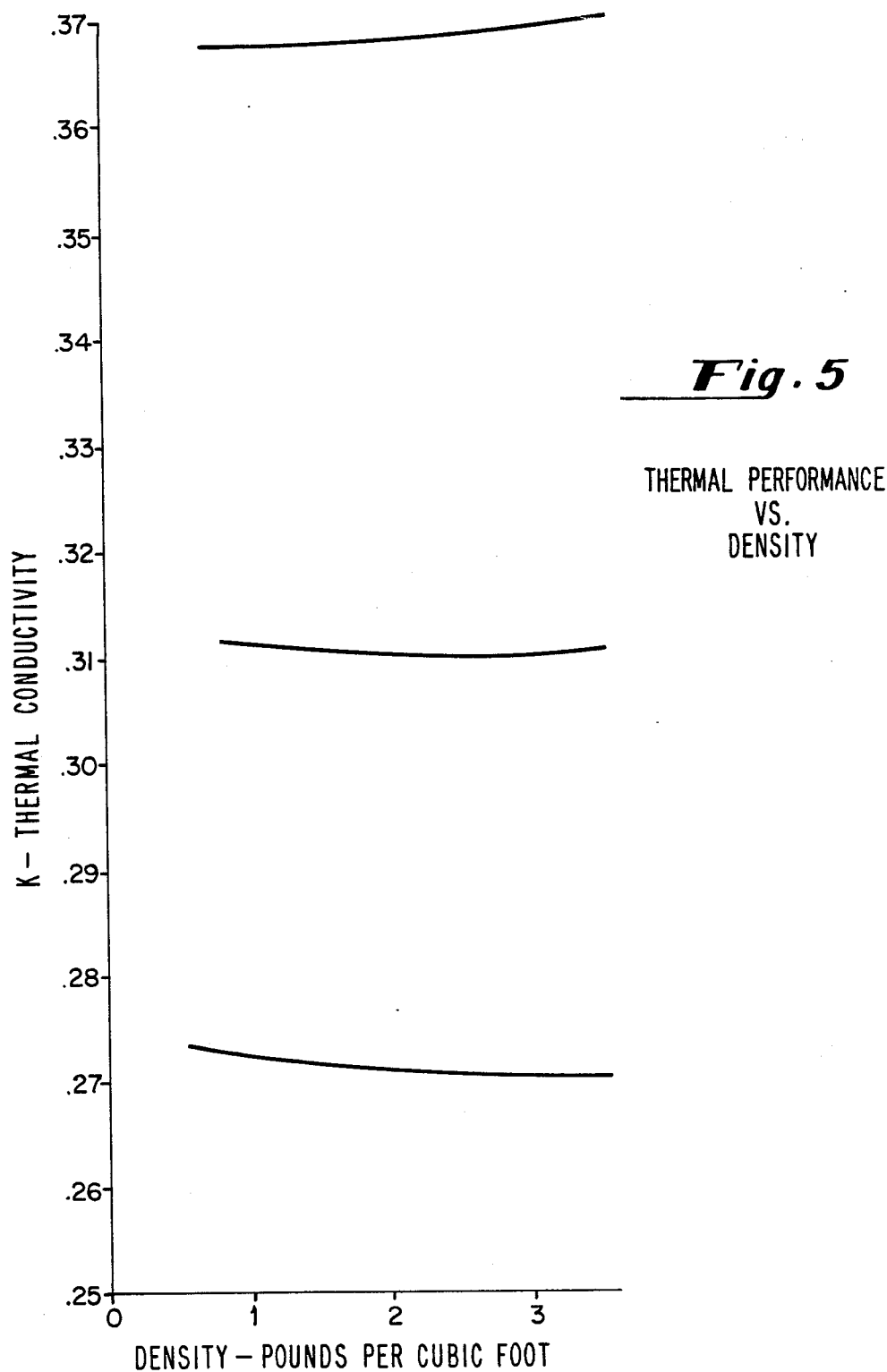
FIG. 5 is a graph showing the thermal coefficient plotted as a function of the dry density of the foam insulation.

FIG. 5 shows three curves which depict the experimentally derived thermal characteristics of the low density foam of the invention. More specifically in each curve the thermal coefficient K is plotted as a function of dry density and is seen to compare favorably with the thermal coefficient of fiberglass insulation even at very low foam densities. In the uppermost curve, the average cell size of the foam insulation ranges from approximately $\frac{1}{8}$" to $\frac{1}{4}$". In the lowermost curve, the average cell size of the foam insulation ranges from approximately 1/32" to 1/16", while in the intermediate curve, the average cell size of the foam insulation ranges from approximately 1/16" to $\frac{1}{8}$". Thermal conductivity measurements included in the data of FIG. 5 were obtained by the guarded hot plate method in accordance with ASTM-C177. Referring to FIG. 5, the foam of the invention has a thermal conductivity of less than 0.37 for a dry density of less than approximately 3 pounds per cubic foot.

Although, the invention has been described with respect to certain specific embodiments, it will be appreciated that modifications and changes may be made by those skilled in the art within the true spirit and scope of the invention. For example, additives in addition to those discussed herein may be added to the low density foam insulation of the invention in order to optimize the characteristics of the foam insulation for a particular application.

What we claim and desire to secure by Letters Patent of the United States is:

1. A thermally insulating composite assembly, comprising generally at least one structural surface element and a low density cellular gypsum material positioned adjacent to said surface element, said cellular gypsum material comprising a gypsum matrix having minute cavities homogeneously distributed therein, said gypsum material having a dry density of less than about 3 pounds per cubic foot and a thermal coefficient of less than about 0.37.

2. A composite assembly according to claim 1, wherein said gypsum material has a dry density of more than about 0.8 pounds per cubic foot.

3. A composite assembly according to claim 2, wherein said gypsum matrix includes at least approximately 0.25% by weight of fibrous material dispersed homogeneously throughout said gypsum matrix.

4. A composite assembly according to claim 3, wherein said fibrous material is comprised of approximately 0.25 to 7% by weight of chopped glass.

5. A composite assembly according to claim 1, further comprising at least first and second joists positioned adjacent to said one structural element for containing said gypsum material therebetween, whereby to form a thermally insulated ceiling structure.

6. A composite assembly according to claim 1, further comprising a second structural element spaced parallel to said one structural element to hold said gypsum material therebetween, whereby to form a thermally insulated composite wall assembly.

7. A low density cellular thermally insulating gypsum material comprising a gypsum matrix having minute cavities homogeneously distributed therein, said gypsum material having a dry density of less than about 3 pounds per cubic foot and a thermal coefficient of less than about 0.37.

8. A low density cellular thermally insulating gypsum material according to claim 7, wherein said gypsum material has a dry density of more than about 0.8 pounds per cubic foot.

9. A low density cellular thermally insulating gypsum material according to claim 8, wherein said gypsum matrix includes at least approximately 0.25 percent by weight of fibrous material dispersed homogeneously throughout said gypsum matrix.

10. A low density cellular thermally insulating gypsum material according to claim 9, where said fibrous material is comprised of approximately 0.25 to 7 percent by weight of chopped glass.

* * * * *